Patented Aug. 25, 1942

2,294,346

UNITED STATES PATENT OFFICE 2,294,346

PURIFICATION OF FUSEL OIL AND AMYL ALCOHOL

Lloyd C. Swallen, Villa Park, Ill., and John B. Tindall, Terre Haute, Ind., assignors to Commercial Solvents Corporation, Terre Haute, Ind., a corporation of Maryland No Drawing. Application October 10, 1940, Serial No. 360,600

7 Claims. (Cl. 202—57)

Our invention relates to the purification of fusel oil and amyl alcohol. More particularly, it relates to an improved process for removing the common impurities present in crude fusel oil, by distilling said crude oil from a mixture comprising a high-boiling ester of amyl alcohol and said crude fusel oil.

Fusel oil, or fermentation amyl alcohol, is of variable composition, depending largely upon the nature of the carbohydrate-containing materials employed in the fermentation, and also probably upon the type of micro-organism utilized, as well as the refining methods employed. In addition to amyl alcohol, which is the chief constituent of fusel oil, there are numerous other alcohols, such as normal propyl alcohol, isobutyl alcohol, and certain of the higher alcohols, such as hexyl and hyptyl alcohols, as well as fatty acid esters, aldehydes, and organic bases. Although the presence of such materials in amyl alcohol is unobjectionable for many uses, it is often desired, particularly in syntheses, to employ amyl alcohol of high purity and especially free from colored impurities. Amyl alcohol of such quality is especially required in instances where the final product must be substantially free from colored impurities. Also, amyl alcohol of high purity is obviously desired in the preparation of various derivatives thereof, since the common impurities associated therewith give rise to numerous side reactions, which, if allowed to remain therein, tend to diminish considerably the ultimate yield.

In the past, fermentation amyl alcohol has been purified by various distillation methods, some of which have been partially satisfactory, but in none of these procedures has it been possible to obtain a product which does not form dark colored impurities when heated in contact with acids, particularly under conditions such as those encountered in esterification reactions. Also it has been common practice to refine crude amyl alcohol by distilling the same with concentrated sulfuric acid. However, the amyl alcohol secured in either of the above processes under esterification conditions darkens rapidly and, as a result, the esters obtained therefrom possess objectionable colored impurities. Because of this fact these esters have, in the past, been unfit to use where colorless and transparent products were desired. This has been found to be especially true with such esters as amyl sebacate, amyl phthalate and the like, which are very satisfactory plasticizers for numerous film forming compositions. Although such compounds possess very desirable plasticizing properties, their use as such, for obvious reasons, has been restricted to the production of materials in which the color of the final product is immaterial, or to use in the production of colored plastics, films, etc., where the colored impurities in said esters did not affect the desired color of the final product. Because of the previous inability to produce amyl alcohol of high purity, the use of esters of the type mentioned above, as plasticizers in the production of colorless plastics as well as in the manufacture of laminated glass, has been impossible.

We have now discovered that crude amyl alcohol obtained either by the fermentation of grain or blackstrap molasses mashes, may be readily and effectively purified by adding the crude alcohol in the presence of a small quantity (1 to 5% by weight) of an esterification catalyst such as sulfuric or phosphoric acids, to a relatively high-boiling amyl ester. During the addition of the crude alcohol to the ester, the temperature is maintained at or slightly above the boiling point of amyl alcohol, but substantially below that of the ester. In order to obtain amyl alcohol of high purity, we have found it desirable to introduce the crude alcohol into the ester at the reflux temperature of the ester-alcohol mixture, thereby causing the alcohol to be distilled off from said mixture as rapidly as it is added. The amyl alcohol thus obtained, after one treatment, as described above, is generally sufficiently pure to meet the most rigorous color specifications. In certain instances, however, particularly in the case of amyl alcohol derived from molasses, it is often necessary to repeat the process several times in order to obtain a grade of alcohol which is substantially free of objectionable impurities. Esters prepared from amyl alcohol, which has been refined in accordance with the above procedure, are substantially water white and those which possess plasticizing properties may be satisfactorily employed in the preparation of transparent, colorless films or plastics.

The esters of amyl alcohol, utilized in carrying out our process, may be any of a large number of compounds. However, it is essential that such esters possess boiling points which are in substantial excess of that of amyl alcohol, and, in addition, it is likewise necessary, of course, that these compounds be capable of withstanding super-atmospheric temperature for relatively long periods of time. As examples of amyl esters which may be employed in our process, there may be mentioned amyl phthalate, amyl sebacate, amyl stearate, amyl borate, amyl phosphate, and the like.

It should be noted at this point that although we have outlined above a general method for carrying out our invention, the underlying theory involved in effecting our purification process is not understood accurately, mainly because of the fact that it is not definitely known what the color forming bodies in fusel oil are, or in what manner, either physically or chemically, they are removed.

Our invention may be further illustrated by the following specific examples:

Example I

Ten gallons of crude molasses fusel oil was added at a rate of one and one-half gallons per hour, to approximately one and one-half gallons of amyl phthalate containing one per cent, by weight, of sulfuric acid. During the addition of the crude fusel oil, the temperature was maintained at a value sufficient to distill off said oil as rapidly as it was added. The distillate obtained in this manner possessed a slight straw color. After repeating the above process twice, substantially water-white amyl alcohol boiling from 126–132° C. was obtained.

Example II

Twenty gallons of crude grain fusel oil was added, at a rate of 1.6 gallons per hour, to approximately three and one-half gallons of amyl sebacate containing 3% by weight of phosphoric acid. During the addition of the crude fusel oil, the temperature was maintained at approximately the boiling point of said oil. The amyl alcohol thus obtained was water-white, and boiled within a range of 126–132° C.

From the foregoing description of our process, it is evident that numerous embodiments of our invention may be made without departing from the spirit thereof. It is therefore to be understood that we do not desire to limit ourselves to the specific embodiments outlined above. For example, the crude fusel oil may be mixed with the high boiling amyl ester after which the resulting mixture is fractionated to obtain the fusel oil in a substantially pure state. A second modification of the preferred embodiment of our invention constitutes the introduction of the crude fusel oil below the surface of the hot amyl ester by means of a suitable device, such as for example, a sparger.

Having now described our invention, what we claim is:

1. A process for the purification of fusel oil, which comprises contacting crude fusel oil, in the presence of a catalytic amount of an acid selected from the group consisting of sulfuric and phosphoric acids, with an ester of amyl alcohol having a boiling point substantially in excess of that of said fusel oil, and said ester being present in an amount sufficient to retain the impurities present in said fusel oil, removing said fusel oil by distillation at a temperature which is approximately equal to or slightly above the boiling point of amyl alcohol, but substantially below the boiling point of said ester.

2. A process for the purification of grain fusel oil, which comprises mixing crude grain fusel oil, a small quantity of an esterification catalyst selected from the group consisting of sulfuric and phosphoric acids, and an ester of amyl alcohol having a boiling point substantially in excess of that of said fusel oil, and said ester being present in an amount sufficient to retain the impurities present in said fusel oil, recovering said fusel oil by distillation at a temperature which is approximately equal to or slightly above the boiling point of amyl alcohol, but substantially below the boiling point of said ester.

3. A process for the purification of fusel oil, which comprises adding crude fusel oil to an ester of amyl alcohol having a boiling point substantially in excess of that of said fusel oil, in the presence of a small quantity of an esterification catalyst selected from the group consisting of sulfuric and phosphoric acids, at the reflux temperature of the ester-fusel oil mixture, said ester being present in an amount sufficient to retain the impurities present in said fusel oil, and removing fusel oil from said mixture by distillation at a temperature which is approximately equal to or slightly above the boiling point of amyl alcohol, but substantially below the boiling point of said ester.

4. A process for the purification of molasses fusel oil, which comprises adding crude molasses fusel oil to an ester of amyl alcohol having a boiling point substantially in excess of that of said molasses fusel oil, in the presence of a small quantity of esterification catalyst selected from the group consisting of sulfuric and phosphoric acids, at the reflux temperature of the ester-fusel oil mixture, said ester being present in an amount sufficient to retain the impurities present in said fusel oil, and removing fusel oil from said mixture by distillation at a temperature which is approximately equal to or slightly above the boiling point of amyl alcohol, but substantially below the boiling point of said ester.

5. A process for the purification of fusel oil which comprises adding crude fusel oil to an ester of amyl alcohol selected from the group consisting of amyl stearate, amyl phthalate, amyl sebacate, amyl borate, and amyl phosphate, in the presence of a small quantity of an esterification catalyst selected from the group consisting of sulfuric and phosphoric acids, at the reflux temperature of the ester-fusel oil mixture, said ester being present in an amount sufficient to retain the impurities present in said fusel oil, and removing fusel oil from said mixture by distillation at a temperature which is approximately equal to or slightly above the boiling point of amyl alcohol, but substantially below the boiling point of said ester.

6. A process for the purification of fusel oil, which comprises treating crude fusel oil with amyl phthalate, at the reflux temperature of the mixture, in the presence of approximately 1% by weight of sulfuric acid, said amyl phthalate being present in an amount sufficient to retain the impurities present in said fusel oil, and removing fusel oil from said mixture by distillation at a temperature which is approximately equal to or slightly above the boiling point of amyl alcohol, but substantially below the boiling point of said amyl phthalate.

7. A process for the purification of fusel oil, which comprises treating crude fusel oil with amyl sebacate, at the reflux temperature of the mixture, in the presence of approximately 3% by weight of phosphoric acid, said amyl sebacate being present in an amount sufficient to retain the impurities present in said fusel oil, and removing fusel oil from said mixture by distillation at a temperature which is approximately equal to or slightly above the boiling point of amyl alcohol, but substantially below the boiling point of amyl sebacate.

LLOYD C. SWALLEN.
JOHN B. TINDALL.